United States Patent
Jin et al.

(10) Patent No.: US 7,779,030 B2
(45) Date of Patent: Aug. 17, 2010

(54) METHOD AND APPARATUS FOR MANAGING CONTENT USING REMOTE USER INTERFACE

(75) Inventors: Ho Jin, Yongin-si (KR); Jae-kwon Kim, Suwon-si (KR); Jung-yon Cho, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 402 days.

(21) Appl. No.: 11/723,868

(22) Filed: Mar. 22, 2007

(65) Prior Publication Data

US 2008/0040351 A1 Feb. 14, 2008

(30) Foreign Application Priority Data

Aug. 10, 2006 (KR) .................. 10-2006-0075807

(51) Int. Cl.
*G06F 17/30* (2006.01)
(52) U.S. Cl. .................. 707/769; 707/802; 709/227
(58) Field of Classification Search .................. 707/609, 707/705, 769, 802; 709/218, 224, 227
See application file for complete search history.

(56) References Cited

U.S. PATENT DOCUMENTS

| | | | |
|---|---|---|---|
| 7,089,307 B2 * | 8/2006 | Zintel et al. .................. | 709/224 |
| 7,243,366 B2 * | 7/2007 | Medvinsky et al. ............ | 726/2 |
| 2004/0120344 A1 | 6/2004 | Sato et al. | |
| 2005/0022210 A1 | 1/2005 | Zintel et al. | |
| 2007/0078987 A1 * | 4/2007 | Walker et al. ................ | 709/227 |

\* cited by examiner

*Primary Examiner*—Fred I Ehichioya
(74) *Attorney, Agent, or Firm*—Sughrue Mion, PLLC

(57) ABSTRACT

A method and apparatus are provided for managing content using a remote user interface (RUI). A method for a first RUI server to provide content to a second RUI server includes: receiving a request to provide content from a device using an RUI provided by the first RUI server; and transmitting access information of the content to the second RUI server, wherein the device is an RUI client to which RUIs from the first RUI server and the second RUI server are provided. Accordingly, since the providing and use of content between a plurality of RUI servers can be managed through RUIs in remote, every RUI client, which can receive an RUI, can control content transmission between the plurality of RUI servers.

18 Claims, 9 Drawing Sheets

```
<html>
<head>
    <title> Internet Media Server Page </title>
    <object id = "MulticastObject" type="application/MulticastForwarder"/>
    <script type = "text/javascript">
    var MulticastIP= "239.255.255.250"
    var MulticastPort = "1850"
    URL = "192.10.10.1/video/content.mp4"
        function CreateForwardSocket()
        {
            MulticastObject.openMulticastConnection(MulticastIP, MulticastPort);
        }
        function ForwardPacket()
        {
            MulticastObject.SetURL(URL);
            MulticastObject.Forward();
        }
        function act()
        {
            CreateForwardSocket();
            ForwardPacket();
        }
    </script>
</head>
<body>
    <form>
        <input id= "Content1Service" type ="button" value="Content1 Stream Service"
        onClick = act()>
    </form>
</body>
</html>
```

METHOD AND APPARATUS FOR MANAGING CONTENT USING REMOTE USER INTERFACE

CROSS-REFERENCE TO RELATED PATENT APPLICATION

This application claims the benefit of Korean Patent Application No. 10-2006-0075807, filed on Aug. 10, 2006, in the Korean Intellectual Property Office, the disclosure of which is incorporated herein in its entirety by reference.

BACKGROUND OF THE INVENTION

1. Field of the Invention

Apparatuses and methods consistent with the present invention relate to managing content using a remote user interface, and more particularly, to providing and using content using a remote user interface in a home network or Internet environment.

2. Description of the Related Art

A remote user interface (RUI) is an interface provided to an RUI client by an RUI server in order to display an interface of a service performed by the RUI server on the RUI client instead of on the RUI server.

Since devices in a network have different purposes, each device is optimized to perform a specific service. In addition, an interface for performing a service specialized for each device is optimized according to each service. Thus, a user who uses a service provided by another device using a predetermined device in the network needs to use an interface suitable for the service. To do this, an RUI for remotely receiving a service using an interface of a device performing the service is used.

Figure 1:
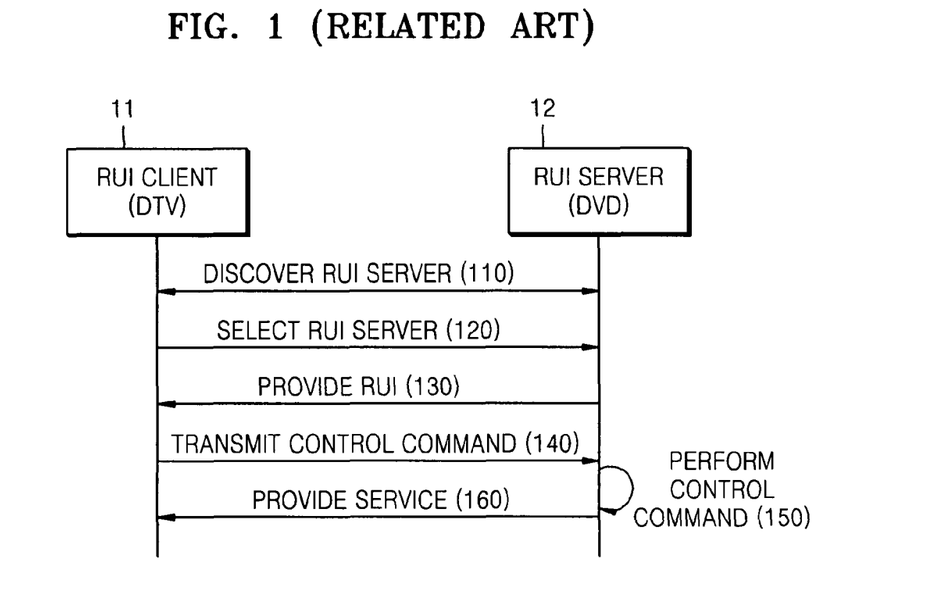
FIG. 1 is a related art method of providing a service using a remote user interface.

FIG. 1 is a related art method of providing a service using an RUI.

In FIG. 1, an RUI client 11 is a digital television (DTV), and an RUI server 12 is a digital versatile disc (DVD) player. FIG. 1 illustrates a case of using DVD content by controlling the DVD player using the DTV.

Referring to FIG. 1, in operation 110, the RUI client 11 discovers RUI servers, which can provide a service through the RUI. In a Universal Plug and Play (UPNP) network, the RUI servers are discovered using a Simple Service Discovery Protocol (SSDP).

In operation 120, the RUI client 11 selects the RUI server 12 which provides a service that a user desires to use from among the discovered RUI servers.

In operation 130, the selected RUI server 12 transmits an RUI of the service to the RUI client 11. That is, the DVD player transmits an RUI of services which can be provided, related to DVD content, e.g., services such as 'play,' 'stop,' and 'subtitle display,' to the DTV.

In operation 140, the user selects a predetermined service through the RUI client 11, and thereby, the RUI server 12 receives a control command from the RUI client 11. That is, if the user selects 'play' through the DTV, a command for instructing the DVD to play is transmitted to the DVD player.

The RUI server 12 performs the control command, such as 'play' or 'stop,' which has been received in operation 140, in operation 150 and then transmits the result of the execution of the control command to the RUI client 11 in operation 160. If the control command received in operation 140 is play of predetermined content, the RUI server 12 provides the content to the RUI client 11.

FIG. 1 illustrates a method for the RUI client 11 to use a service provided by the single RUI server 12 using an RUI provided by the RUI server 12. However, the RUI client 11 may use a service by receiving an RUI from each of a plurality of RUI servers.

Figure 2:
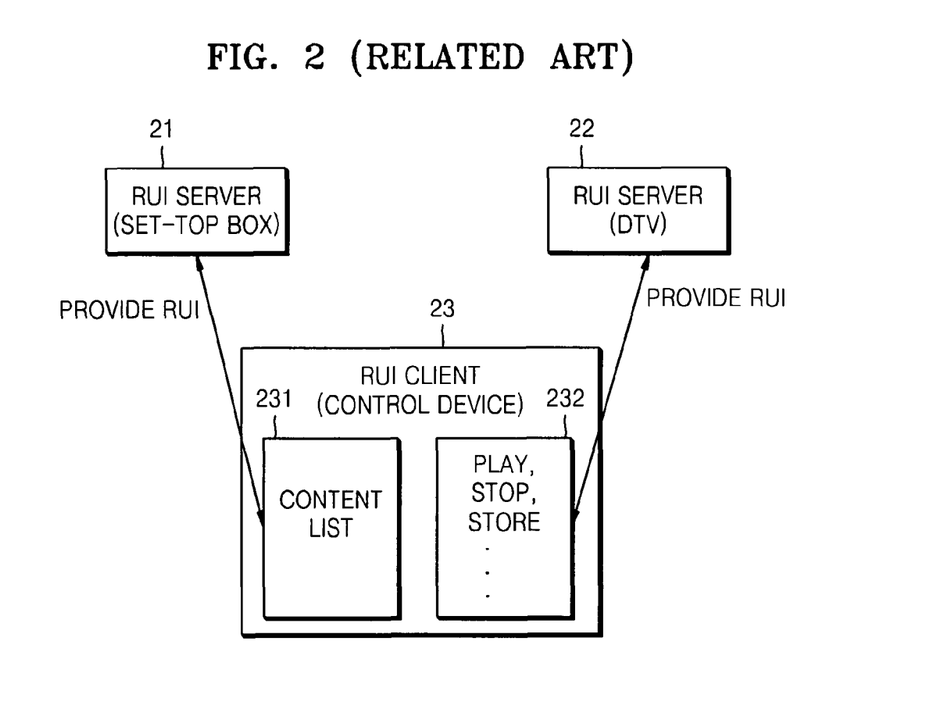
FIG. 2 is a block diagram for describing a case where a service is used through a remote user interface client to which a remote user interface is provided from a plurality of remote user interface servers, according to the related art.

FIG. 2 is a block diagram for describing a case where a service is used through an RUI client 23 to which an RUI is provided from a plurality of RUI servers 21 and 22, according to the prior art.

Referring to FIG. 2, the RUI client 23 uses a service by receiving an RUI from each of the plurality of RUI servers 21 and 22. For example, it is assumed that the content stored in a set-top box, which is one RUI server 21, is played or stored in a DTV, which is another RUI server 22.

The set-top box 21 provides a streaming service, and the DTV 22 provides services, such as 'play' and 'store,' which are related to the streaming service. The set-top box 21 provides a content list to a control device, which is the RUI client 23, using an RUI, and the DTV 22 provides a service, such as 'play' or 'store,' related to the streaming service to the control device 23 using an RUI.

As illustrated in FIG. 1, the RUI is used to provide a service through peer-to-peer control between the RUI server 12 and the RUI client 11. Thus, in order to provide a service to the user by linking the plurality of RUI servers 21 and 22 illustrated in FIG. 2, a separate protocol or application for linking and controlling the plurality of RUI servers 21 and 22 must be realized in the control device 23.

Thus, if an RUI of a control device is not an RUI realized by a protocol or application for linking and controlling a plurality of RUI servers as a general web browser, a method of linking services provided by the plurality of RUI servers and providing the services to a user is required.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention provides a method and apparatus for providing and using content between a plurality of RUI servers controlled by an RUI client in which a separate protocol or application is not realized.

The present invention also provides a computer readable recording medium storing a computer readable program for executing the method.

According to an aspect of the present invention, there is provided a method for a first RUI server to provide content to a second RUI server, the method comprising: receiving a content providing request from a predetermined device using an RUI provided by the first RUI server; and transmitting access information of the content to the second RUI server, wherein the device is an RUI client to which RUIs from the first RUI server and the second RUI server are provided.

The receiving of the content providing request may comprise receiving a key value from the device, which indicates that the content is requested by the device and the transmitting of the access information may comprise multicasting the access information and the key value.

The key value may comprise at least one of an Internet Protocol (IP) address and a Media Access Control (MAC) address of the device.

According to another aspect of the present invention, there is provided a method for a second RUI server to use content of a first RUI server, the method comprising: receiving a content play request from a predetermined device using an RUI provided by the second RUI server; and receiving access information of the content from the first RUI server, wherein the device is an RUI client to which RUIs from the first RUI server and the second RUI server are provided.

The receiving of the content play request may comprise receiving a key value, which indicates that the content is requested by the device, from the device, and the receiving of the access information may comprise receiving the access information and the key value, which the device has transmitted to the first RUI server in order to indicate that the content is requested by the device, from the first RUI server.

According to another aspect of the present invention, there is provided an apparatus for a first RUI server to provide content to a second RUI server, the apparatus comprising: a request receiver receiving a content providing request from a predetermined device using an RUI provided by the first RUI server; and a transmitter transmitting access information of the content to the second RUI server, wherein the device is an RUI client to which RUIs from the first RUI server and the second RUI server are provided.

According to another aspect of the present invention, there is provided an apparatus for a second RUI server to use content of a first RUI server, the apparatus comprising: a request receiver receiving a content use request from a predetermined device using an RUI provided by the second RUI server; and an access information receiver receiving access information of the content from the first RUI server, wherein the device is an RUI client to which RUIs from the first RUI server and the second RUI server are provided.

According to another aspect of the present invention, there is provided a computer readable recording medium storing a computer readable program for executing the method.

BRIEF DESCRIPTION OF THE DRAWINGS

The above and/or other aspects of the present invention will be more apparent by describing certain exemplary embodiments of the present invention with reference to the accompanying drawings, in which.

DETAILED DESCRIPTION OF THE EXEMPLARY EMBODIMENTS OF THE INVENTION

Figure 3A:
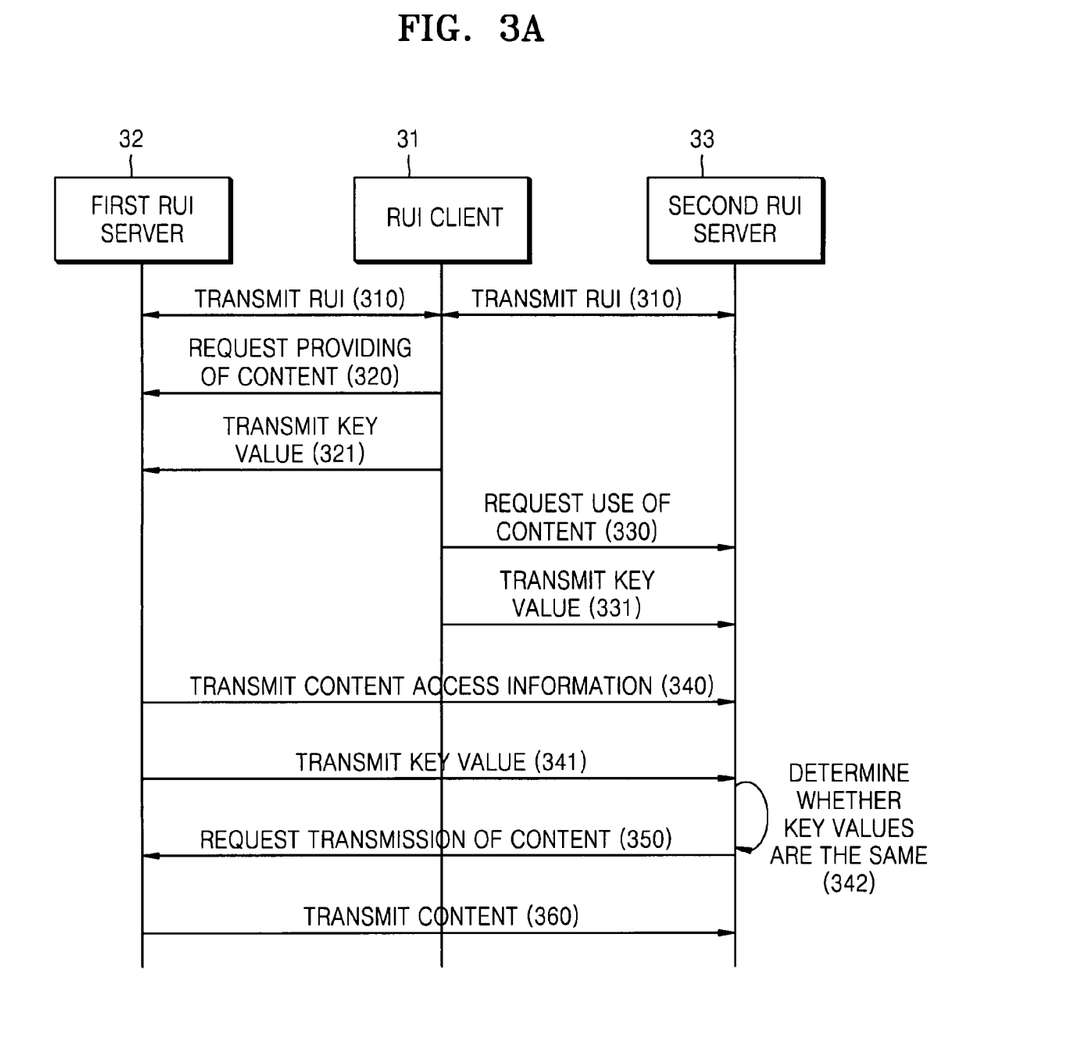
FIG. 3A is a flowchart illustrating a method of managing content according to an exemplary embodiment of the present invention.

FIG. 3A is a flowchart illustrating a method of managing content according to an exemplary embodiment of the present invention.

Referring to FIG. 3A, a RUI client 31 manages content provided to a second RUI server 33 by a first RUI server 32 using RUIs provided by the plurality of RUI servers 32 and 33.

In operation 310, the first RUI server 32 and the second RUI server 33 transmits RUIs to the RUI client 31. As described in FIG. 2, the first RUI server 32 can provide an RUI related to a content list 231 to the RUI client 31 as a set-top box, and the second RUI server 33 can provide an RUI related to 'play,' 'stop,' 'store,' and so on, 232 to the RUI client 31 as a DTV.

If the RUI client 31 and the plurality of RUI servers 32 and 33 are devices in a UPnP network, the RUI client 31 discovers the plurality of RUI servers 32 and 33 using a SSDP, and an RUI is provided to the RUI client 31 according to a UPnP RUI standard.

In operation 320, the first RUI server 32 receives, from the RUI Client 31, a content providing request which requests that content be provided. That is, a user selects predetermined content from the content list 231 displayed in the RUI provided to the RUI client 31 by the first RUI server 32, and the first RUI server 32 receives a content providing request to provide the selected content from the RUI client 31.

If the RUI client 31 does not have a separate protocol or application for controlling the transmission of the content, since the first RUI server 32 just has provided a RUI to the RUI client 31 and does not know about the second RUI server 33, the first RUI server 32 does not know which RUI server receives the content. Thus, the content is not transmitted according to the content providing request transmitted by the RUI client 31 in operation 320, and the content providing request is only a request for the first RUI server 32 to prepare transmission of the content.

If the first RUI server 32 provides an RUI to the RUI client 31 using HyperText Transfer Protocol (HTTP) as a general web browser, the content providing request in operation 320 is performed using an HTTP request message.

The first RUI server 32 that has received the content providing request in operation 320 may transmit a response message to the RUI client 31 to inform the RUI client 31 that the first RUI server 32 is ready to transmit. In this case, if the content providing request message is an HTTP request message, the response message will also be an HTTP response message.

In operation 321, the first RUI server 32 receives a key value from the RUI client 31, which is used to confirm that content to be transmitted to the second RUI server 33 is the content requested by the RUI client 31.

Since the current exemplary embodiment is to link the service of a first RUI server 32, which has provided an RUI to the RUI client 31, with the service of a second RUI server 33, only the RUI client 31, the first RUI server 32, and the second RUI server 33 must be associated with transmission and reception of the content. Thus, a method to confirm the association of the first RUI server 32 with the second RUI server 33 and to confirm that both servers are ready for the content to be transmitted or received by providing the RUIs to the RUI client 31 is required.

Thus, the RUI client 31 transmits a key value to each of the first RUI server 32 and the second RUI server 33, and only if the key value of the first RUI server 32 is the same as the key value of the second RUI server 33, is the content transmitted and received between the first RUI server 32 and the second RUI server 33.

The first RUI server 32 may receive both the content providing request and the key value in operation 320 and does not require receiving the key value in a separate operation 321. Alternatively, the first RUI server 32 may use information, such as an IP address or an MAC address of the RUI client 31, already known to the first RUI server 32, as the key value without separately receiving the key value.

In operation 330, the second RUI server 33 receives a content use request of the first RUI server 32 from the RUI client 31. That is, the content use request is performed by selecting a predetermined service from among services, such as 'play,' 'store,' and so on, displayed on the RUI provided to the RUI client 31 by the second RUI server 33.

Since the second RUI server 33 just has provided the RUI to the RUI client 31 and does not know about the first RUI server 32, the second RUI server 33 does not know which RUI server the content is provided from. Thus, the content is not received according to the content use request transmitted by the RUI client 31 in operation 330, and the content use request is only a request for the second RUI server 33 to prepare reception of the content.

If the second RUI server 33 provides the RUI to the RUI client 31 using HTTP as a general web browser, the content use request in operation 330 will also be performed using an HTTP request message.

The second RUI server 33, which has received the content use request in operation 330, may transmit to the RUI client 31 a response message for informing that the second RUI server 33 is ready to receive. In this case, if the content use request message is an HTTP request message, the response message is an HTTP response message.

In operation 331, the second RUI server 33 receives a key value, which is used to confirm that the content to be received from the first RUI server 32 is the content requested by the RUI client 31, from the RUI client 31.

As described in operation 321, the second RUI server 33 does not have to separately receive the key value and may receive both the content use request and the key value in operation 330. Alternatively, the second RUI server 33 may use information, such as the IP address or the MAC address of the RUI client 31, already known to the second RUI server 33 as the key value without separately receiving the key value.

Since operations 320 and 330 are procedures individually performed by the RUI client 31 for the first RUI server 32 and the second RUI server 33, it will be understood by those of ordinary skill in the art that the sequence can be changed or operations 320 and 330 can be performed at the same time.

In operation 340, the first RUI server 32 transmits information on the content to the second RUI server 33. The information on the content includes a Universal Resource Identifier (URI), Digital Right Management (DRM) or metadata of the content. In order for the second RUI server 33 to request the first RUI server 32 for the content and receive the content, information for access to the content is required. Thus, all kinds of information for the second RUI server 33 to identify and access the content can be included in the information on the content.

Since the first RUI server 32 does not yet know which RUI server will receive the content, the first RUI server 32 may multicast or broadcast the access information of the content so that the second RUI server 33 can receive the access information. The first RUI server 32 may repeatedly multicast or broadcast the access information until the second RUI server 33 receives the access information.

In operation 341, the first RUI server 32 transmits the key value that has been received from the RUI client 31 in operation 321 to the second RUI server 33, so that the second RUI server 33 can compare the key value that has been received in operation 341 to the key value that has been received in operation 331.

The key value transmission in operation 341 may be performed by multicasting or broadcasting as with the content information transmission in operation 340 since the first RUI server 32 does not yet know which RUI server will receive the content information. The first RUI server 32 may repeatedly multicast or broadcast the key value until the second RUI server 33 receives the key value. As described in operation 321, the first RUI server 32 does not have to separately transmit the key value and may transmit both content access information and the key value together in operation 340.

The second RUI server 33, which has received the access information or the key value, transmits to the first RUI server 32 an acknowledgement (ACK) message for informing that the access information or the key value has been received. Since the first RUI server 32 multicasts or broadcasts the access information or the key value because the first RUI server 32 does not know whether the second RUI server 33 receiving the access information or the key value, the first RUI server 32 will not know that the second RUI server 33 has received the access information or the key value until the first RUI server 32 receives a separate message informing it of this fact. Thus, by transmitting the ACK message to the first RUI server 32, the second RUI server 33 informs the first RUI server 32 that the second RUI server 33 has received the access information or the key value and the first RUI server 32 does not have to continue to multicast or broadcast the access information or the key value.

In operation 342, the second RUI server 33 compares the key value that has been received in operation 341 to the key value that has been received in operation 331. If true two key values are the same, the second RUI server 33 moves onto operation 350.

In operation 350, the second RUI server 33 transmits a content transmission request to the first RUI server 32. That is, the content transmission request is performed based on the access information of the content that has been received from the first RUI server 32 in operation 340.

When content is identified using a key value, the second RUI server 33 compares the key value received from the RUI client 31 in operation 331 to the key value received from the first RUI server 32 in operation 341, and transmits the content transmission request to the first RUI server 32 only if the two key values are the same. The content transmission request can be performed using an HTTP Get message, however, the requesting method is not limited.

In operation 360, the first RUI server 32 transmits the content requested in operation 350 to the second RUI server 33. Thus, the RUI client 31 in which a separate protocol or application for linking the first RUI server 32 and the second RUI server 33 to each other is not implemented, can manage content to be provided and used between the two RUI servers 32 and 33 using a general RUI.

Figure 3B:
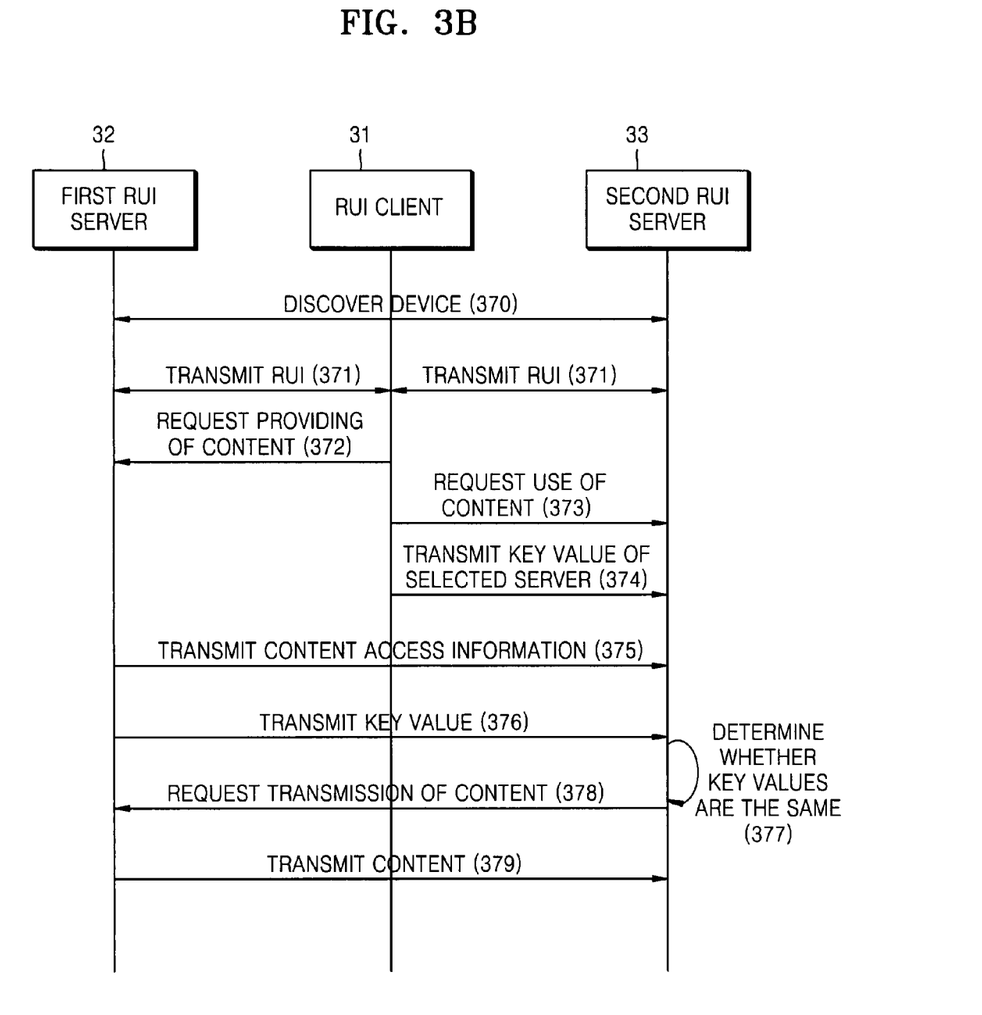
FIG. 3B is a flowchart illustrating a method of managing content according to another exemplary embodiment of the present invention.

FIG. 3B is a flowchart illustrating a method of managing content according to another exemplary embodiment of the present invention.

FIG. 3B illustrates a case where the first RUI server 32 and the second RUI server 33 provide content to each other and use each other's content by performing discovery. For example, this exemplary embodiment corresponds to a case where the first RUI server 32 and the second RUI server 33 can automatically perform discovery since both the first RUI server 32 and the second RUI server 33 belong to the same home network. However, the home network is different from a general home network in that a user controls providing or use of content not by using the first RUI server 32 or the second RUI server 33 but by using the separate RUI client 31 to which an RUI is provided from each of the first RUI server 32 and the second RUI server 33.

Referring to FIG. 3B, in operation 370, the first RUI server 32 and the second RUI server 33 discover each other. That is, a content server is discovered using the SSDP, and then the content server is searched for services it can provide. In operation 370, key values to be used for content transmission are also exchanged. Thus, the second RUI server 33 discovers all content servers including the first RUI server 32, which can provide content thereto and receives a key value of each of the discovered servers.

In operation 371, the first RUI server 32 and the second RUI server 33 transmit RUIs to the RUI client 31. The RUI provided to the RUI client 31 by the second RUI server 33 includes the interface for providing a service described above, such as 'play' or 'store,' and information about all content servers, which can provide content to the second RUI server 33. The first RUI server 32 is included in the content servers.

The RUI provided to the RUI client 31 by the second RUI server 33 in operation 370 includes key values of all content servers which have been received, including the first RUI server 32.

In operation 372, a user selects predetermined content of the first RUI server 32 using the RUI client 31.

In operation 373, the user selects the first RUI server 32 as a server, which provides content through the RUI that has been received from the second RUI server 33 in operation 371, and selects a service to be performed in the second RUI server 33. For example, the user informs the second RUI server 33 that a 'play' or 'store' service is used for content received from the first RUI server 32, by selecting the 'play' or 'store' service and simultaneously selecting the first RUI server 32.

In operation 374, the second RUI server 33 receives a key value from the RUI client 31. In this exemplary embodiment, the key value is not the IP address or the MAC address of the RUI client 31 but a key value of the first RUI server 32 among the key values that have been received from the second RUI server 33 in operation 371. That is, only a key value of the server selected by the user using the RUI client 31 is transmitted so that the second RUI server 33 can compare the key values to each other in operation 377 and receive content from the first RUI server 32.

In operation 375, the first RUI server 32 transmits information which is required to access the content to the second RUI server 33. That is, the first RUI server 32 transmits information required to access the content requested in operation 372 to the second RUI server 33. In this exemplary embodiment, URI information, DRM information, or the like of the content is transmitted. The first RUI server 32 may multicast or broadcast the access information of the content.

In operation 376, the first RUI server 32 transmits a key value to the second RUI server 33. The key value does not have to be separately transmitted and can be transmitted with the content access information in operation 375. The key value may be transmitted using a multicasting or broadcasting method.

In operation 377, the second RUI server 33 compares the key value that has been received in operation 374 to the key value that has been received in operation 376. If the two key values are the same, the second RUI server 33 requests the first RUI server 32 for the content in operation 378 and then receives the content from the first RUI server 32 in operation 379.

Alternatively, instead of receiving the key value of the selected content server from the RUI client in operation 374, the key value received in operation 376 can be compared to the key value received together the RUI in operation 371, and if the two key values are the same, the transmission of the content can be requested.

Figure 4:
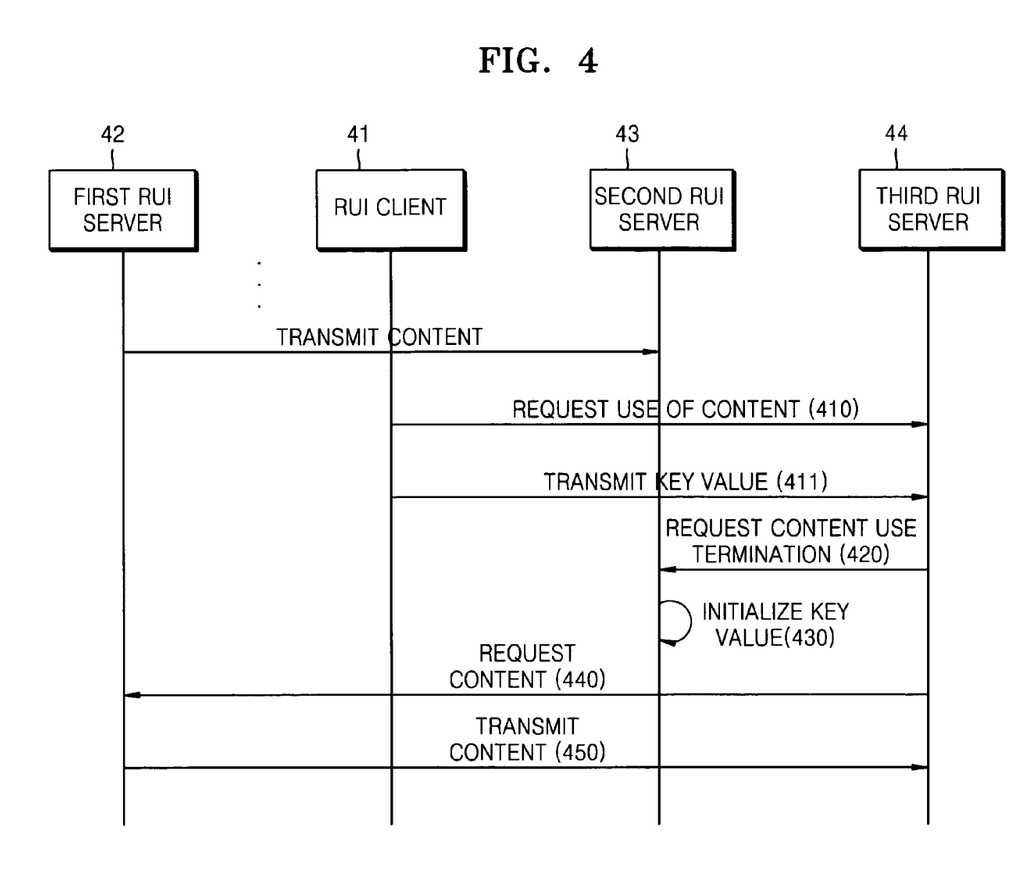
FIG. 4 is a flowchart illustrating a method of managing content according to another exemplary embodiment of the present invention.

FIG. 4 is a flowchart illustrating a method of managing content according to another exemplary embodiment of the present invention.

FIG. 4 illustrates an exemplary embodiment method of managing content when a user continuously uses the content provided by a first RUI server 42 by using a third RUI server 44 to move the content from a second RUI server 43 to the third RUI server 44 while using the content received by the second RUI server 43.

That is, by receiving an RUI from the third RUI server 44, an RUI client 41 requests the use of content again while using the content. For example, FIG. 4 illustrates a method of managing content when the user desires to use the content using a Liquid Crystal Display (LCD) monitor, which is the third RUI server 44, while using the content provided by a set-top box, which is the first RUI server 42, using a DTV, which is the second RUI server 43.

Referring to FIG. 4, in operation 410, the third RUI server 44 receives a content use request of the first RUI server 42 from the RUI client 41. At this point, the content is not received according to the content use request, and the content use request is only a request for the third RUI server 44 to prepare reception of the content. Alternatively, the third RUI server 44 may transmit a response to the content use request to the RUI client 41.

In operation 411, the third RUI server 44 receives a key value from the RUI client 41. The key value is a value for confirming that content to be received from the first RUI server 42 is the same content that was requested by the RUI client 41.

Since the first RUI server 42 has already multicasted or broadcasted content access information and a key value thereof in order to transmit the content to the second RUI server 43, the third RUI server 44 knows information of the content. Thus, unlike operations 340 and 341 of FIG. 3A, the first RUI server 42 does not have to re-multicast or re-broadcast the content access information and the key value.

In operation 420, the third RUI server 44 requests the second RUI server 43, which is using the content, to terminate the use of the content. Operation 420 is an operation for requesting to terminate the use of the content and perform a key value initialization process and is performed by the third RUI server 44 multicasting or broadcasting a message for requesting the content use termination.

In operation 430, the second RUI server 43 terminates the use of the content and performs the key value initialization process.

The third RUI server 44 requests the first RUI server 42 for the content in operation 440 and receives the content in operation 450.

Since the content used by the second RUI server 43 can be used by the third RUI server 44 in operations 410 through 450, the content can be continuously used using various devices.

Figure 5:
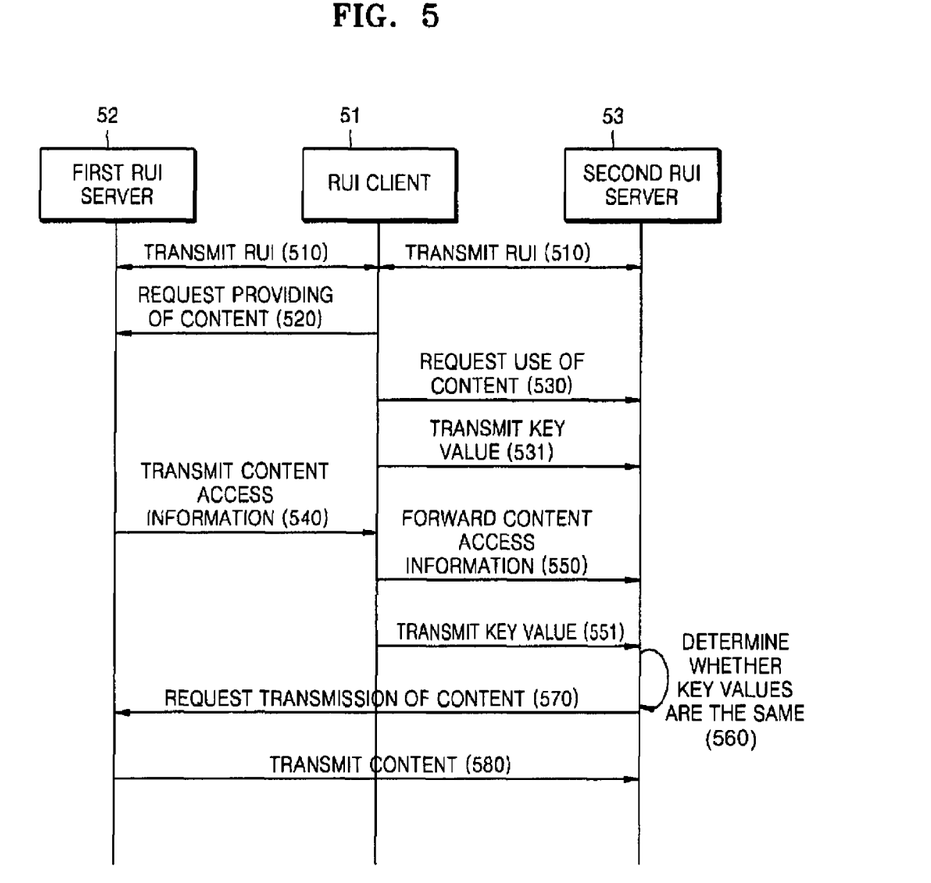
FIG. 5 is a flowchart illustrating a method of managing content according to another exemplary embodiment of the present invention.

FIG. 5 is a flowchart illustrating a method of managing content according to another exemplary embodiment of the present invention.

FIG. 5 illustrates an exemplary embodiment of a method for a second RUI server 53 to use content of a first RUI server 52 when networks to which RUI servers belong are different, i.e., when the first RUI server 52 is a device, which has the content on the Internet and the second RUI server 53 is a DTV in a home network. That is, FIG. 5 illustrates an exemplary embodiment of a method of managing content when the first RUI server 52 cannot directly transmit access information of the content to the second RUI server 53 in the multicasting or broadcasting method since networks to which the RUI servers 52 and 53 belong are different.

Referring to FIG. 5, in operation 510, the first RUI server 52 and the second RUI server 53 transmit RUIs to an RUI client 51. As described in FIG. 3A, the first RUI server 52 provides a list of stored content to the RUI client 51 using the RUI, and the second RUI server 53 provides the RUI for services, such as 'play,' 'stop,' and 'store,' to the RUI client 51.

In operation 520, the first RUI server 52 receives a content providing request from the RUI client 51. The first RUI server 52 only has provided the RUI to the RUI client 51 and does not know about the second RUI server 53. Thus, the content is not transmitted according to the content providing request transmitted by the RUI client 51 in operation 520, and the content providing request is only a request for the first RUI server 52 to prepare transmission of the content.

Since information directly transmitted from first RUI server 52 to the second RUI server 53 does not exist, an operation, such as operation 321 of FIG. 3A, in which the first RUI server 52 receives a key value from the RUI client 51 in order to transmit the key value to the second RUI server 53 also does not exist.

In operation 530, the second RUI server 53 receives a content use request of the first RUI server 52 from the RUI client 51. Since the second RUI server 53 has only provided the RUI to the RUI client 51 and does not know about the first RUI server 52, the content is not received according to the content use request transmitted by the RUI client 51 in operation 530, and instead, the content use request is only a request for the second RUI server 53 to prepare reception of the content.

In operation 531, the second RUI server 53 receives a key value, which is used to confirm that content to be received is the same content requested by the RUI client 51, from the second RUI server 53 as in operation 331 of FIG. 3A.

In operation 540, the first RUI server 52 transmits information required to access the content requested in operation 520 to the RUI client 51. The content access information may include URI, DRM, or metadata of the content.

In operation 550, the second RUI server 53 receives from the RUI client 51 the content access information, which has been received from the first RUI server 52 by the RUI client 51. Since the second RUI server 53 cannot directly receive the information required for an access to the content from the first RUI server 52, the second RUI server 53 receives the content access information via the RUI client 51. The second RUI server 53 may receive the content access information multicasted or broadcasted by the RUI client 51.

When the content access information is forwarded, a process of processing the content access information in the RUI client 51 and forwarding the processed content access information to the second RUI server 53 can be implemented in various ways. For example, the user of the RUI client 51 can forward a URL of the content to the second RUI server 53 by copying the URL of the content included in the RUI provided by the first RUI server 52 to the RUI provided by the second RUI server 53 and operating the RUI provided by the second RUI server 53.

In one exemplary embodiment, the RUI client 51 may multicast or broadcast the content access information, which has been received from first RUI server 52, through a separate communication module included in the RUI client 51.

However, if the RUI that the RUI client 51 has received from first RUI server 52 is edited using HyperText Markup Language (HTML), the RUI client 51 may transmit the content access information without the separate communication module. That is, when Java script, included in the RUI provided by the first RUI server 52, is used, the RUI client 51 multicasts or broadcasts the content access information using a communication module object or plug-in embedded in a web browser indicating the RUI is edited using HTML.

Figure 6:
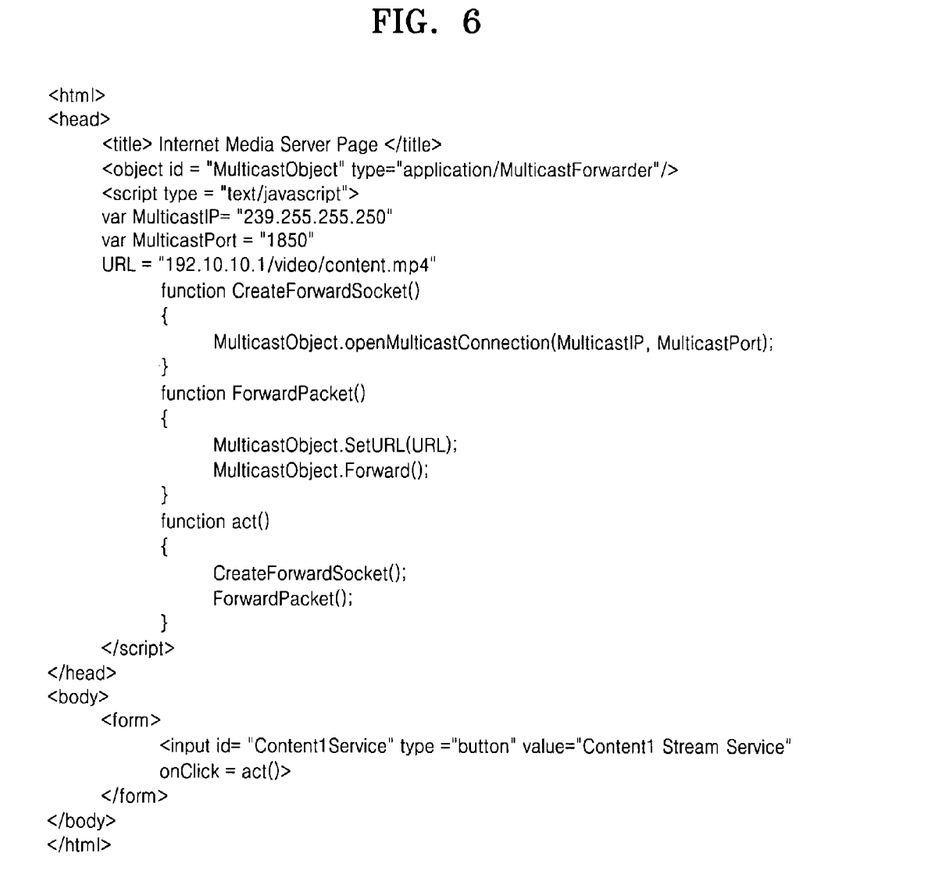
FIG. 6 illustrates a remote user interface according to an exemplary embodiment of the present invention.

FIG. 6 illustrates an RUI according to another exemplary embodiment of the present invention.

FIG. 6 illustrates the RUI provided to the RUI client 51 by the first RUI server 52 in order for the RUI client 51 to multicast or broadcast the content access information to the second RUI server 53 without the separate communication module.

Referring to FIG. 6, the first RUI server 52 provides the RUI represented using HTML to the RUI client 51.

A 'body' tag denotes a content list displayed to the user through the RUI client 51. According to the 'body' tag, on a screen displayed to the user through the RUI client 51, a button named 'Content1 Stream Service' is displayed to the user though a web browser.

If the button is clicked, 'act( )' is executed, and the execution is represented using a Java script in a 'head' tag. Objects used in the Java script compatible objects, such as ActiveX and Plug-In, used in a general web browser and must be previously defined to perform the transmission of the access information.

The RUI client 51 creates a socket for multicasting using 'CreatForwardSocket( )'. If the socket is created, the information required for an access to the content is forwarded to the second RUI server 53 through 'ForwardPacket( )'.

In operation 551, the second RUI server 53 receives a key value from the RUI client 51.

In operation 560, the second RUI server 53 compares the key value that has been received in operation 531 to the key value that has been received in operation 551. If the two key values are the same, it is confirmed that the content to be received from the first RUI server 52 is the content requested by the RUI client 51, and thus the second RUI server 53 requests the first RUI server 52 to transmit the content in operation 570 and receives the content from the first RUI server 52 in operation 580.

As in the embodiment illustrated in FIG. 4, in the current exemplary embodiment, content being used can be continuously used through another RUI server in the middle of the use of the content through the second RUI server 53. In this case, it will be understood by those of ordinary skill in the art that operations 410 through 450 of FIG. 4 can be applied in the same manner.

Figure 7:
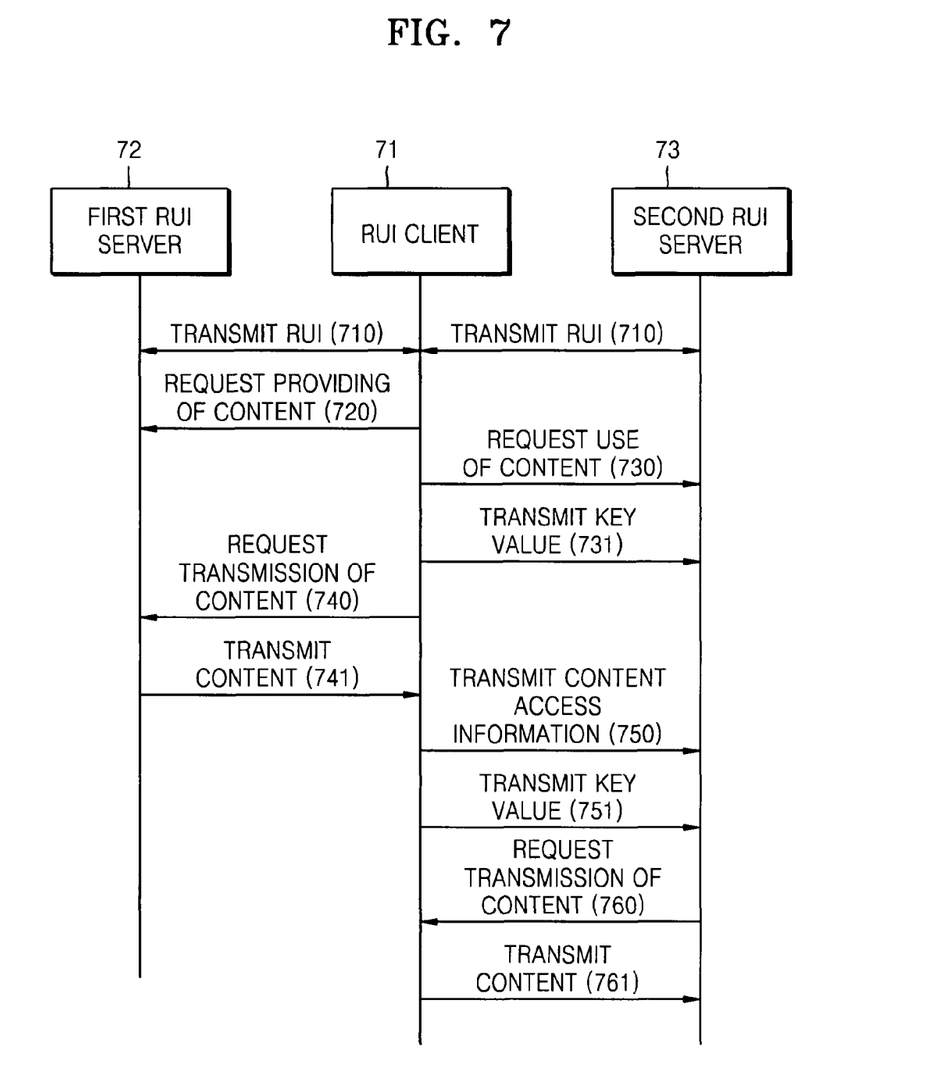
FIG. 7 is a flowchart illustrating a method of managing content according to another exemplary embodiment of the present invention.

FIG. 7 is a flowchart illustrating a method of managing content according to another exemplary embodiment of the present invention.

FIG. 7 illustrates an exemplary method for a second RUI server 73 to use content of a first RUI server 72 when networks to which RUI servers belong are different, i.e., when the first RUI server 72 is a device, which has the content, in the Internet and the second RUI server 73 is a DTV in a home network. In the current exemplary embodiment, the second RUI server 73 cannot directly receive the content from the first RUI server 72 due to a login policy or limitation of a network environment. Thus, FIG. 7 illustrates a method of managing content when the second RUI server 73 must receive both access information of the content and the content of the first RUI server 72 through an RUI client 71.

Referring to FIG. 7, in operation 710, the first RUI server 72 and the second RUI server 73 transmit RUIs to the RUI client 71. Although the first RUI server 72 and the second RUI server 73 cannot communicate with each other, the RUI client 71 can communicate with each of the first RUI server 72 and the second RUI server 73, and thus, the RUI client 71 receives the RUIs from the first RUI server 72 and the second RUI server 73.

In operation 720, the first RUI server 72 receives a content providing request from the RUI client 71. The content providing request is a request for the first RUI server 72 to prepare transmission of the content.

In operation 730, the second RUI server 73 receives a content use request from the RUI client 71. The content use request is a request for the second RUI server 73 to prepare the use of the content.

In operation 731, the second RUI server 73 receives a key value, which is used to confirm that content to be received is the content requested by the RUI client 71, from the RUI client 71.

The first RUI server 72 receives a transmission request of the content from the RUI client 71 in operation 740 and transmits the content to the RUI client 71 in operation 741.

In operation 750, the RUI client 71, which has received the content from the first RUI server 72, multicasts or broadcasts information required for an access to the content. Unlike the exemplary embodiment illustrated in FIG. 5, when the RUI client 71 multicasts or broadcasts content access information, information, such as a URL, for an access to the content, which has been received from the first RUI server 72 and stored in the RUI client 71, is transmitted instead of information, such as a URL, for an access to the content possessed by the first RUI server 72.

In operation 751, the second RUI server 73 receives a key value which is multicasted or broadcasted by the RUI client 71.

The second RUI server 73 requests the RUI client 71 for transmission of the content in operation 760 and receives the content from the RUI client 71 in operation 761.

Figure 8:
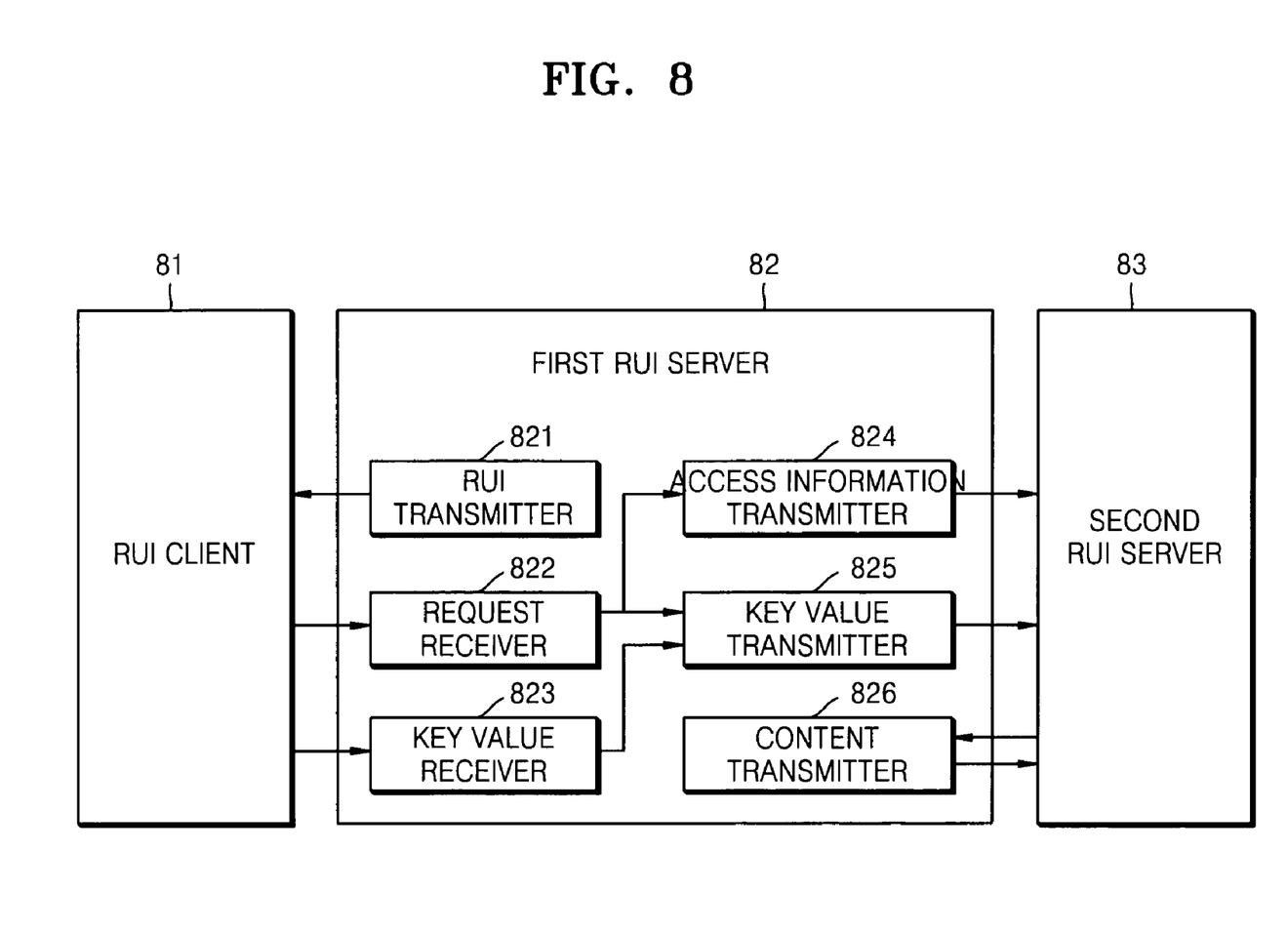
FIG. 8 is a block diagram of an apparatus for providing content according to an exemplary embodiment of the present invention.

FIG. 8 is a block diagram of an apparatus for providing content according to an exemplary embodiment of the present invention.

FIG. 8 illustrates a content providing apparatus of a first RUI server 82 when the first RUI server 82 provides content to a second RUI server 83 according to a request of an RUI client 81 to which the first RUI server 82 has provided an RUI.

Referring to FIG. 8, the content providing apparatus includes an RUI transmitter 821, a request receiver 822, a key value receiver 823, an access information transmitter 824, a key value transmitter 825, and a content transmitter 826.

The RUI transmitter 821 provides an RUI to the RUI client 81. The RUI client 81 receives RUIs from the first RUI server 82 and the second RUI server 83 at the same time.

The request receiver 822 content providing request from the RUI client 81 through the RUI provided by the RUI transmitter 821. In this case, an HTTP request message may be received. The received message is not a message for requesting transmission of the content but a message for requesting for preparation of the transmission.

The key value receiver 823 receives a key value from the RUI client 81. The key value is a value used to confirm in the second RUI server 83 that the content to be transmitted by the first RUI server 82 is content requested by the RUI client 81. The key value may be an IP or MAC address of the RUI client 81.

The access information transmitter 824 transmits information required to access the content, which is transmission requested according to the content providing request received by the request receiver 822, to the second RUI server 83. Since the second RUI server 83 has only provided the RUI to the RUI client 81 and does not know which RUI server will transmit the content, the first RUI server 82 transmits the content access information to the second RUI server 83. The content access information may be transmitted in a multicasting or broadcasting method.

If the first RUI server 82 cannot directly transmit the access information or the key value to the second RUI server 83, the first RUI server 82 may transmit the access information or the key value to the RUI client 81, and the RUI client 81 may forward the access information or the key value to the second RUI server 83.

The content transmitter 826 receives a transmission request of the content from the second RUI server 83 and transmits the content to the second RUI server 83 in response to the content transmission request. That is, the second RUI server 83 requests the first RUI server 82 for transmission of the content according to the content access information and the key value that has been received from the first RUI server 82, and the content transmitter 826 transmits the content to the second RUI server 83 in response to the content transmission request.

Figure 9:
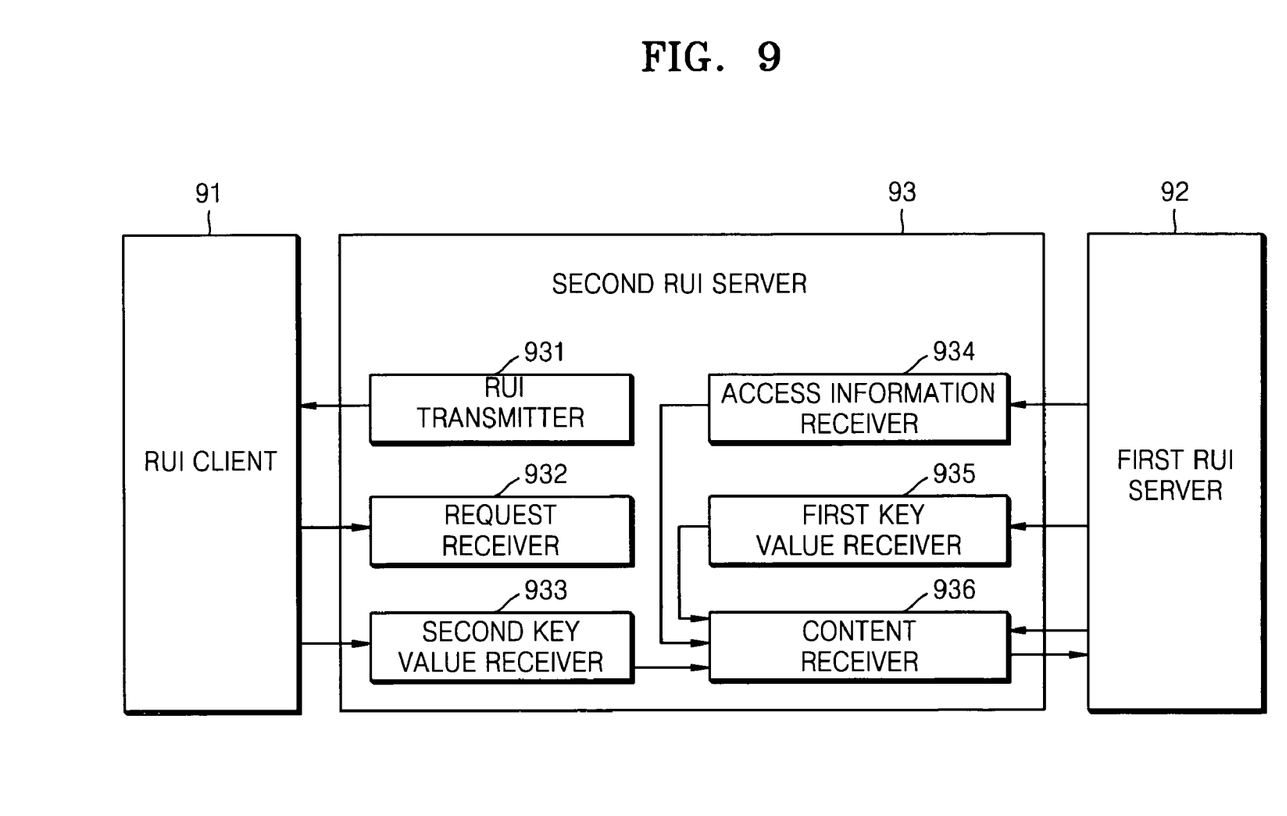
FIG. 9 is a block diagram of an apparatus for using content according to an exemplary embodiment of the present invention.

FIG. 9 is a block diagram of an apparatus for using content according to an exemplary embodiment of the present invention.

FIG. 9 illustrates an exemplary content using apparatus of a second RUI server 93 when the second RUI server 93 uses content of a first RUI server 92 according to a request of an RUI client 91 to which the second RUI server 93 has provided an RUI.

Referring to FIG. 9, the content using apparatus includes an RUI transmitter 931, a request receiver 932, a first key value receiver 935, a second key value receiver 933, an access information receiver 934, and a content receiver 936.

The RUI transmitter 931 provides an RUI to the RUI client 91. The RUI client 91 receives RUIs from the first RUI server 92 and the second RUI server 93 at the same time.

The request receiver 932 receives a content use request from the RUI client 91 through the RUI provided by the RUI transmitter 931. In this case, an HTTP request message may be received. The content is not immediately received by the content use request, but a message for requesting for preparation of content reception is received.

The second key value receiver 933 receives a key value from the RUI client 91. The key value is a value transmitted by the first RUI server 92 in order to confirm that the content to be transmitted by the first RUI server 92 is content requested by the RUI client 91. The key value may be an IP or MAC address of the RUI client 91.

The access information receiver 934 receives information required for access to the content of the first RUI server 92 from the first RUI server 92. Since the second RUI server 93 has only provided an RUI to the RUI client 91 and does not know which RUI server transmits the content, the second RUI server 93 receives the content access information transmitted by the first RUI server 92 and requests transmission of the received content based on the content access information. The received content access information may be multicasted or broadcasted by the first RUI server 92.

The first key value receiver 935 receives a key value that the first RUI server 92 has received from the RUI client 91 and forwards it. Like the access information, the received key value may be multicasted or broadcasted by the first RUI server 92.

If the second RUI server 93 cannot directly receive the access information or the key value from the first RUI server 92, the second RUI server 93 may receive the access information or the key value, which has been transmitted from the first RUI server 92 to the RUI client 81, from the RUI client 81.

The content receiver 936 requests the first RUI server 92 for transmission of the content and receives the content transmitted from the first RUI server 92 in response to the request. The content receiver 936 requests the first RUI server 92 for transmission of the content based on the access information and the key value, which have been received from first RUI server 92, and receives the content transmitted from the first RUI server 92 in response to the request. In this case, the transmission of the content is requested only if the key value received by the first key value receiver 935 is the same as the key value received by the second key value receiver 933.

An example of the invention can also be embodied as computer readable codes on a computer readable recording medium. The computer readable recording medium can be any data storage device that can store data which can be thereafter read by a computer system. Examples of the computer readable recording medium include read-only memory (ROM), random-access memory (RAM), compact-disc, magnetic tapes, floppy disks, and optical data storage devices. The computer readable recording medium can also be distributed over network coupled computer systems so that the computer readable code is stored and executed in a distributed fashion.

As described above, according to the present invention, since the providing and use of content between a plurality of RUI servers can be managed through RUIs in remote, every RUI client, which can receive an RUI, can control content transmission between the plurality of RUI servers.

While the present invention has been particularly shown and described with reference to exemplary embodiments thereof, it will be understood by those of ordinary skill in the art that various changes in form and detail may be made therein without departing from the spirit and scope of the present invention as defined by the following claims.

What is claimed is:

1. A method for a first Remote User Interface (RUI) server to provide content to a second RUI server, the method comprising:
   providing an RUI to a device;
   receiving at the first RUI server a request from the device to provide content stored in the first RUI server, wherein the device uses the RUI provided by the first RUI server for transmitting the request to the first RUI server;
   in response to the request, transmitting access information of the content from the first RUI server to the second RUI server;
   receiving, at the first RUI server, a request from the second RUI server to transmit the content, the request transmitted by the second RUI server in response to the second RUI server receiving the access information from the first RUI server; and
   transmitting the content to the second RUI server in response to the request to transmit the content,
   wherein the device is an RUI client to which RUIs from the first RUI server and the second RUI server are provided.

2. The method of claim 1, wherein the receiving of the request to provide content comprises receiving a key value, which indicates that the content is requested by the device, from the device, and
   the transmitting of the access information comprises multicasting the access information and the key value.

3. The method of claim 2, wherein the transmitting of the access information further comprises receiving from the second RUI server an acknowledgement signal for informing that the multicasted key value has been received.

4. The method of claim 2, wherein the key value comprises at least one of an Internet Protocol (IP) address and a Media Access Control (MAC) address of the device.

5. The method of claim 1, wherein the transmitting of the access information comprises transmitting the access information of the content to the device so that the device can multicast the access information of the content.

6. The method of claim 1, wherein the access information comprises at least one of Digital Right Management (DRM) information and metadata of the content.

7. A method for a second Remote User Interface (RUI) server to use content of a first RUI server, the method comprising:
   providing an RUI to a device;
   receiving at the second RUI server a request from the device to use content, wherein the device uses the RUI provided by the second RUI server to transmit the request to the second RUI server;
   receiving at the second RUI server access information of the content from the first RUI server; and
   requesting, by the second RUI server, the first RUI server to transmit the content in response to receiving the access information from the first RUI server; and
   receiving the content transmitted by the first RUI server in response to the request to transmit content,
   wherein the device is an RUI client to which RUIs from the first RUI server and the second RUI server are provided.

8. The method of claim 7, wherein the receiving of request to use the content comprises receiving a key value, which indicates that the content is requested by the device, from the device, and
   the receiving of the access information comprises receiving the access information and the key value, which the device has transmitted to the first RUI server in order to indicate that the content is requested by the device, from the first RUI server.

9. The method of claim 8, wherein the key value comprises at least one of an Internet Protocol (IP) address and a Media Access Control (MAC) address of the device.

10. The method of claim 7, wherein the access information is information that the device has received from the first RUI server and multicasted.

11. The method of claim 7, wherein the access information comprises at least one of Digital Right Management (DRM) information and metadata of the content.

12. An apparatus for a first Remote User Interface (RUI) server to provide content to a second RUI server, the apparatus comprising:
   an RUI transmitter which provides an RUI to a device;
   a request receiver which receives a request from the device to provide content, wherein the device uses the RUI provided by the first RUI server for transmitting the request to the first RUI server;

a transmitter which transmits access information of the content to the second RUI server in response to the request;

a transmission request receiver which receives, at the first RUI server, a request from the second RUI server to transmit the content in response to receiving the access information from the first RUI server; and a content transmitter which transmits the content to the second RUI server in response to the request to transmit the content, wherein the device is an RUI client to which RUIs from the first RUI server and the second RUI server are provided and the first RUI server comprises the apparatus.

13. The apparatus of claim 12, further comprising:

a key value receiver which receives a key value from the device, which indicates that the content is requested by the device, and a key value transmitter which transmits the received key value to the second RUI server.

14. The apparatus of claim 13, wherein the key value comprises at least one of an Internet Protocol (IP) address and a Media Access Control (MAC) address of the device.

15. An apparatus for a second Remote User Interface (RUI) server to use content of a first RUI server, the apparatus comprising:

an RUI transmitter which provides an RUI to a device;

a request receiver which receives a request from the device to use content, wherein the device uses the RUI provided by the second RUI server to transmit the request to the second RUI server;

an access information receiver which receives access information of the content from the first RUI server;

a content transmission request unit which transmits a request from the second RUI server to the first RUI server to transmit the content in response to the access information received from the first RUI server; and a content receiver which receives the content transmitted by the first RUI server in response to the request to transmit the content, wherein the device is an RUI client to which RUIs from the first RUI server and the second RUI server are provided, and the second RUI server comprises the apparatus.

16. The apparatus of claim 15 further comprising:

a first key value receiver which receives a key value, which has been transmitted to the first RUI server by the device in order to indicate that the content is requested by the device, from the first RUI server; and a second key value receiver which receives a key value transmitted by the device, wherein the content transmission request unit requests the first RUI server to transmit the content only if the key value received by the first key value receiver is the same as the key value received by the second key value receiver.

17. The apparatus of claim 16, wherein the key value comprises at least one of an Internet Protocol (IP) address and a Media Access Control (MAC) address of the device.

18. A computer readable recording medium storing a computer readable program for executing the method for a first Remote User Interface (RUI) server to provide content to a second RUI server, the method comprising:

providing an RUI to a device;

receiving at the first RUI server a request from the device to provide content stored in the first RUI server, wherein the device uses the RUI provided by the first RUI server for transmitting the request to the first RUI server; and in response to the request, transmitting access information of the content from the first RUI server to the second RUI server;

receiving, at the first RUI server, a request from the second RUI server to transmit the content, the request transmitted by the second RUI server in response to the second RUI server receiving the access information from the first RUI server; and transmitting the content to the second RUI server in response to the request to transmit the content, wherein the device is an RUI client to which RUIs from the first RUI server and the second RUI server are provided.

* * * * *